(12) United States Patent
Dalal et al.

(10) Patent No.: US 7,689,767 B2
(45) Date of Patent: Mar. 30, 2010

(54) METHOD TO DETECT AND SUGGEST CORRECTIVE ACTIONS WHEN PERFORMANCE AND AVAILABILITY RULES ARE VIOLATED IN AN ENVIRONMENT DEPLOYING VIRTUALIZATION AT MULTIPLE LEVELS

(75) Inventors: Chirag Deepak Dalal, Maharashtra (IN); Vaijayanti Rakshit Bharadwaj, Sunnyvale, CA (US)

(73) Assignee: Symantec Operating Corporation, Mountain View, CA (US)

( * ) Notice: Subject to any disclaimer, the term of this patent is extended or adjusted under 35 U.S.C. 154(b) by 341 days.

(21) Appl. No.: 10/954,733

(22) Filed: Sep. 30, 2004

(65) Prior Publication Data

US 2006/0069864 A1    Mar. 30, 2006

(51) Int. Cl.
*G06F 13/00* (2006.01)
*G06F 13/28* (2006.01)
(52) U.S. Cl. ..................... 711/114; 710/104
(58) Field of Classification Search ........... 711/114; 710/104
See application file for complete search history.

(56) References Cited

U.S. PATENT DOCUMENTS

| 5,440,737 | A | 8/1995 | Uchinuma | 395/600 |
|---|---|---|---|---|
| 5,897,661 | A | 4/1999 | Baranovsky et al. | 711/170 |
| 6,078,990 | A | 6/2000 | Frazier | 711/114 |
| 6,457,139 | B1* | 9/2002 | D'Errico et al. | 714/5 |
| 6,519,679 | B2 | 2/2003 | Devireddy et al. | 711/114 |
| 6,748,510 | B1* | 6/2004 | Coatney | 711/170 |
| 7,143,259 | B2* | 11/2006 | Dalal et al. | 711/170 |
| 2002/0087780 | A1 | 7/2002 | Selkirk et al. | 711/6 |
| 2002/0133539 | A1 | 9/2002 | Monday | 709/203 |
| 2003/0115204 | A1 | 6/2003 | Greenblatt et al. | 707/10 |
| 2003/0135609 | A1* | 7/2003 | Carlson et al. | 709/224 |
| 2003/0229698 | A1* | 12/2003 | Furuhashi et al. | 709/226 |
| 2004/0210608 | A1 | 10/2004 | Lee et al. | 707/204 |
| 2005/0010529 | A1* | 1/2005 | Zalewski et al. | 705/54 |
| 2006/0031648 | A1 | 2/2006 | Ishikawa et al. | 711/162 |

FOREIGN PATENT DOCUMENTS

WO    WO 0225870 A1 *    3/2002

OTHER PUBLICATIONS

Definition of Disk Array (http://www.google.com/search?hl=en&rls=GGLD,GGLD:2004-30,GGLD:en&defl=en&q=define:disk+array&sa=X&oi=glossary_definition&ct=title).*

(Continued)

*Primary Examiner*—Matt Kim
*Assistant Examiner*—Edward J Dudek
(74) *Attorney, Agent, or Firm*—Campbell Stephenson LLP

(57) ABSTRACT

A computer system or memory medium with instructions executable by a computer system to detect and/or suggest corrective actions when performance and availability are violated in an environment deploying virtualization at multiple levels. In one embodiment the computer system receives identities of a plurality of first physical storage devices, wherein storage in the plurality of first physical storage devices was logically aggregated to create a first storage object. The computer system also receives identities of a plurality of second physical storage devices, wherein storage in the plurality of second physical storage devices was logically aggregated to create a second storage object. Then, the computer system compares the identity of each of the plurality of first physical storage devices with the identities of the plurality of second physical storage devices.

16 Claims, 2 Drawing Sheets

OTHER PUBLICATIONS

Alvarez, Guillermo A., et al., MINERVA: *An Automated Resource Provisioning Tool for Large-Scale Storage Systems*, Hewlett-Packard Laboratories, ACM Transactions on Computer Systems, vol. 19, No. 4.

*Computer Dictionary*, Third Edition, 1997 Microsoft Press, p. 176 (definition of *engine*).

Tanenbaum, Andrew S., *Hardware, Software, and Mutlilevel Machines*, Structured Computer Organization, Second Edition, 1984 Prentice-Hall, Inc. pp. 10-12.

*VERITAS Volume Manager 3.5: User's Guide—VERITAS Enterprise Administrator*, VERITAS Software Corporation, Jul. 2002, pp. i-118, http://www.filibeto.org/sun/lib/nonsun/veritas/vxvm/3.5/248612.pdf.

* cited by examiner

METHOD TO DETECT AND SUGGEST CORRECTIVE ACTIONS WHEN PERFORMANCE AND AVAILABILITY RULES ARE VIOLATED IN AN ENVIRONMENT DEPLOYING VIRTUALIZATION AT MULTIPLE LEVELS

BACKGROUND OF THE INVENTION

Businesses employ large scale data centers for storing and processing their business critical data. These data centers often consist of a layer of hosts (e.g., computer servers) coupled to a layer of data storage subsystems via a storage area network (SAN). This background and the detailed description below will be described with reference to a data center consisting of a single host coupled to a layer of data storage subsystems via a SAN, it being understood that the present invention should not be limited thereto.

FIG. 1 shows in block diagram form relevant components of an exemplary data center 10. The operational aspects of data center 10 described below should not be considered prior art to the claims set forth herein. Data center 10 includes host 12 coupled to data storage subsystems 16-20 via SAN 22. SAN 22 may consist of several devices (e.g., routers, switches, etc.) for transmitting input/output (IO) transactions or other data between host 12 and data storage subsystems 16-20. For purposes of explanation, FIG. 1 shows one device (e.g., a switch) 14 within SAN 22 it being understood that the term SAN should not be limited thereto.

Each of the data storage subsystems 16-20 includes several physical storage devices. For purposes of explanation, the physical storage devices take form in hard disks, it being understood that the term physical storage device should not be limited to hard disks. Data storage subsystems 16-20 may take different forms. For example, data storage system 16 may consist of "just a bunch of disks" (JBOD) connected to and accessible by an array controller card. Data storage subsystem 18 may consist of an intelligent disk array. Data storage system 20 may consist of a block server appliance. For purposes of explanation, each of the data storage subsystems 16-20 will take form in an intelligent disk array (hereinafter disk array), it being understood that the term data storage subsystem should not be limited thereto.

As noted, each of the disk arrays 16-20 includes several hard disks. The hard disk is the most popular storage device currently used. A hard disk's total storage capacity is divided into many small chunks called physical memory blocks. For example, a 10 GB hard disk contains millions of physical memory blocks, with each block able to hold 512 bytes of data. Any random physical memory block can be written to or read from in about the same amount of time, without having to first read from or write to other physical memory blocks. Once written, a physical memory block continues to hold data even after the hard disk is powered down.

Host node 12 includes an application 26 which is configured to generate IO transactions for accessing data in one or more logical data volumes (more filly described below). Host 12 also includes a storage manager 30 coupled to volume descriptions memory 40 and volume specifications memory 50. FIG. 1 also shows that each of the disk arrays 16-20 have their own storage managers. The storage managers in disk arrays 16-20 are coupled to respective virtual disk descriptions memories 52-56. Each of the storage managers shown in FIG. 1 may take form in software instructions executing on one or more processors. Volume Manager™ provided by VERITAS Software Corporation of Mountain View, Calif., is the exemplary storage manager, it being understood that the term storage manager should not be limited thereto.

Storage managers can create storage objects. For example, storage managers can create storage objects called virtual disks from hard disks. To illustrate, storage managers in disk arrays 16-20 logically aggregate hard disks to create virtual disks. Virtual disks typically have better characteristics (e.g., higher storage capacity, greater effective data transfer rates, etc.) than individual hard disks. Storage managers can also logically aggregate virtual disks to create other storage objects. For example, storage managers can aggregate virtual disks to create storage objects called data volumes. To illustrate, storage manager 30 can logically aggregate virtual disks provided by disk arrays 16-20 to create a volume $V_E$, more fully described below.

Virtual disks and other storage objects are abstractions and each can be viewed as an array of logical memory blocks that store or are configured to store data. While it is said that a logical memory block stores or is configured to store data, in reality the data is stored in at least one physical memory block of a hard disk mapped directly or indirectly to the logical memory block. Configuration maps or algorithms may be used to map logical memory blocks of a virtual disk or other storage object to physical memory blocks.

As noted, storage manager 30 can aggregate virtual disks provided by disk arrays 16-20 to form logical volume $V_E$. In general logical volumes are presented for direct or indirect access by an application such as application 26 executing on host 12. Application 26 can generate IO transactions to read data from or write data to logical memory blocks of a data volume not knowing that the data volume is a logical aggregation of underlying virtual disks, which in turn may be logical aggregations of hard disks within disk arrays 16-20.

Logical volumes are created by storage manager 30 according to the requirements of specifications (also known as intents) provided thereto. Logical volume specifications define how underlying virtual disks are to be aggregated. The more common forms of aggregation include concatenated storage, striped storage, mirrored storage, or RAID storage. A more complete discussion of how virtual disks can be aggregated can be found within Dilip M. Ranade [2002], "Shared Data Clusters," Wiley Publishing, Inc., which is incorporated herein by reference in its entirety. Specifications may further include aggregation rules that ensure a desired performance (e.g., greater effective data transfer rates) and/or data availability. For example, a specification for a mirrored volume may have a fault tolerance rule or a rule which requires that the constituent mirrors do not share hard disks in order to ensure data availability notwithstanding a failure of a hard disk used to store data of the mirrored volume. A specification for a striped volume may have a disk confinement rule which requires that each column is formed directly or indirectly from hard disks contained in a single disk array. A specification for a volume may have a performance based rule which requires all underlying hard disks of the volume are accessed through respective disk array controllers. Other volume aggregation rules are contemplated.

A logical volume description is created for each logical volume. Logical volume descriptions may be stored in volume descriptions memory 40. In general, a logical volume description defines the relationship of a logical volume to its underlying virtual disks or other storage objects. The description may include a configuration map or algorithm that can be used to map each logical memory block of the logical volume to one or more logical blocks of one or more underlying virtual disks or other storage objects. Storage manager 30 uses configuration maps or algorithms to translate IO transactions that access a logical volume into one or more IO transactions that access one or more underlying virtual disks or other storage objects. Consider for example a two-way mirrored volume $V_E$ created by storage manager 30. First and second mirrors of volume $V_E$ are formed from logical storage in virtual disks $M1_E$ and $M2_E$, respectively, provided by disk array 16. Volume $V_E$ is structured to consist of $n_{max}$ logical memory blocks. Storage manager 30 creates a configuration map for volume $V_E$ and stores the configuration map into memory 40. The configuration map maps each logical block x of volume $V_E$ to respective logical blocks x in virtual disks $M1_E$ and $M2_E$. When storage manager 30 receives an IO transaction to write data D to logical memory block 3 of volume $V_E$, storage manager 30 accesses the configuration map for volume $V_E$ to learn that logical memory block 3 in volume $V_E$ is mapped to respective logical blocks 3 in virtual disks $M1_E$ and $M2_E$. Storage manager 30 can then generate separate IO transactions to write data D to block 3 in virtual disks $M1_E$ and $M2_E$.

A virtual disk description is created for each virtual disk created in the disk arrays 16-20. These virtual disk descriptions may be stored in virtual disk description memories 52-56. The virtual disk description defines the relationship of a virtual disk to its underlying hard disks. The virtual disk description may also include a configuration map or algorithm that can be used to map each logical memory block of the virtual block to one or more physical memory blocks of one or more underlying hard disks. Storage managers 32-36 use configuration maps or algorithms to translate IO transactions that access a virtual disk into one or more IO transactions that access one or more underlying hard disks. Consider for example, concatenated virtual disk $M1_E$ created by storage manager 32 from underlying hard disks d1 and d2 (not shown) of disk array 16. Virtual disk $M1_E$ consists of $n_{max}$ logical memory blocks. Storage manager 32 creates a configuration map for virtual disk $M1_E$ and stores the configuration map into memory 52. The configuration map maps each logical block x of virtual disk $M1_E$ to a physical block y in hard disk d1 or d2. When storage manager 32 receives an IO transaction to write data D to, for example, logical memory block 3 of virtual disk $M1_E$, storage manager 32 accesses the configuration map for virtual disk $M1_E$ to learn that logical memory block 3 is mapped to, for example, physical memory block 565 in hard disk d2. Storage manager 32 can then generate an IO transaction to write data D to block 565.

It is noted that the configuration of virtual disks or other storage objects can change over time. For example, data in hard disk d2 of virtual disk $M1_E$ described above may be evacuated to hard disk d3 in disk array 16. When the configuration of a virtual disk changes, the corresponding virtual disk description is updated to reflect the changes. Storage managers of the data center shown in FIG. 1 are independent and don't communicate with each other after a virtual disk reconfiguration, and this can lead to problems. To illustrate, presume that storage manager 30 creates two-way mirrored volume $V_E$ consisting of $n_{max}$ logical memory blocks. The specification for mirrored volume $V_E$ requires fault tolerance (i.e., each mirror must be formed from virtual disks that do not share underlying hard disks). The mirrors of volume $V_E$ are formed from logical storage space of virtual disks $M1_E$ and $M2_E$, respectively, provided by disk array 16. Further, virtual disk $M1_E$ is created as a concatenation of storage in hard disks d1 and d2 within disk array 16, while virtual disk $M2_E$ is created as a concatenation of storage in hard disks d3 and d4 within disk array 16. Presume that hard disks d3 and d4 are large when compared to hard disks d1 and d2 and contain a substantial portion of unused physical storage space. Since virtual disks $M1_E$ and $M2_E$ do not share hard disks to store mirrored volume $V_E$ data, volume $V_E$ is initially consistent with its fault tolerance rule.

Presume that after creation of mirrored volume $V_E$, storage manager 32 evacuates volume $V_E$ data from hard disk d1 to hard disk d4. Once the evacuation is completed, storage manager 32 updates the description for virtual disk $M1_E$ to indicate that it is an aggregation of hard disks d2 and d4. Host node 12, however, is not made aware of the reconfiguration of virtual disk $M1_E$. The reconfiguration of virtual disk $M1_E$, however, results in a violation of mirrored volume $V_E$'s specification rule that volume $V_E$'s mirrors do not share hard disks.

SUMMARY OF THE INVENTION

A computer system or memory medium with instructions executable by a computer system to detect and/or suggest corrective actions when volume or other storage object aggregation rules are violated in an environment deploying virtualization at multiple levels. In one embodiment the computer system receives information relating to a plurality of first physical storage devices, wherein storage in the plurality of first physical storage devices is logically aggregated to create a first storage object. The computer system also receives information relating to a plurality of second physical storage devices, wherein storage in the plurality of second physical storage devices is logically aggregated to create a second storage object. Then, the computer system processes the information related to the first and second plurality of physical storage devices to identify a violation of one or more volume aggregation rules. In one embodiment, the information related to the first and second plurality of physical storage devices includes an identity of each of the first and second plurality of physical storage devices. In this embodiment, the computer system compares the identity of each of the plurality of first physical storage devices with the identities of the plurality of second physical storage devices to identify violations of one or volume aggregation rules.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The present invention provides an apparatus or method for detecting violation of one or more aggregation rules for volumes or other storage objects. The present invention can be employed as software instructions executing on a computer system such as a server. A computer system employing the present invention can generate a user message that contains instructions for correcting an aggregation rule violation in response to detecting the aggregation rule violation. Lastly, in response to detecting an aggregation rule violation, a computer system employing the present invention can generate a command that when executed corrects the detected aggregation rule violation. The command can be executed in the computer itself, or the command can be transmitted to another device (e.g., a disk array) for execution. It is noted that the computer system can generate a command that when executed corrects a detected aggregation rule violation even if the aggregation rule violation was not detected by the computer system. Other aspects of the present invention are contemplated.

Figure 2:
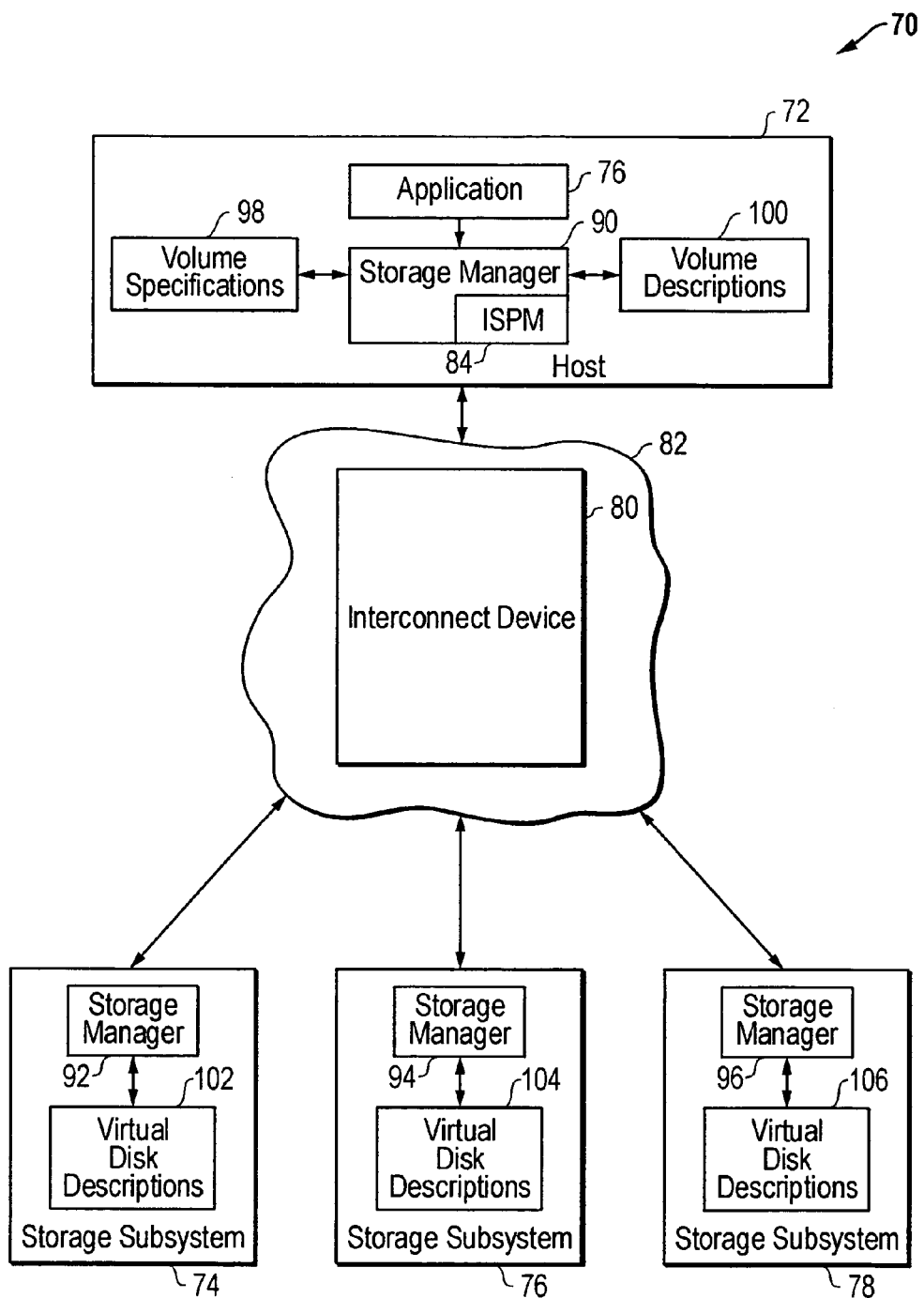
FIG. 2 illustrates a block diagram of a data center in which the present invention may be employed and used.

FIG. 2 illustrates in block diagram form relevant components of an exemplary data center 70 employing one embodiment of the present invention. It is noted that the present invention should not be limited to data centers such as that shown within FIG. 2. Data center 70 includes a host (e.g., server or other computer system) 72 coupled to data storage subsystems 74-78 via SAN 82. SAN 82 may consist of several devices (e.g., switches, routers, etc.) coupled together to enable data communication (e.g., the transmission of I/O transactions) between host 72 and storage subsystems 74-78. For purposes of explanation SAN 82 will be described as having a interconnect device (e.g., Fibre Channel switch) 80 through which host 72 may communicate with storage subsystems 74-78. Each of host 72, storage subsystems 74-78, and interconnect device 80 includes one or more processors capable of processing data according to instructions of one or more software components.

Data storage subsystems 74-78 may take differing forms. For purposes of explanation only, each of the data storage subsystems 74-78 is implemented as a disk array having several physical storage devices, it being understood that the term data storage subsystem should not be limited thereto. The physical storage devices of the disk arrays 74-78 are presumed to be hard disks, it being understood that the term physical storage device should not be limited thereto.

Host 72 includes an application 76 executing on one or more processors. Application 76 may take one of many different forms. For example, application 76 may take form in a database management system (DBMS), customer relationship management software, a file system, etc. Regardless of the form, application 76 generates IO transactions for reading data from or writing data to one or more data volumes.

Host 72 also includes a storage manager 90 coupled to volume specification memory 98 and volume description memory 100. Storage manager 90 is configured to logically aggregate virtual disks provided by disk arrays 74-78 or other storage objects to create data volumes for direct or indirect access by application 76. Logical volumes may be created by storage manager 90 according to the requirements of specifications (also known as intents) provided thereto. It is noted that volume specifications can be generated and provided to memory 98 in accordance with principals described in U.S. patent application Ser. No. 10/327,558, filed Dec. 20, 2002, entitled "A Language for Expressing Storage Allocation Requirements," which is incorporated herein by reference in its entirety.

The volume specifications may further include one or more volume aggregation rules that ensure volume performance and/or data availability. For example, a specification in memory 98 for a mirrored volume may include a fault tolerant rule that requires constituent mirrors of the volume to be formed from respective virtual disks provided by a disk array, and that the respective virtual disks do not share underlying hard disks. The specification for the mirrored volume alternatively may include a disk confinement rule that requires constituent mirrors of the volume to be formed from respective virtual disks provided by respective disk arrays. Other rules are contemplated.

Figure 1:
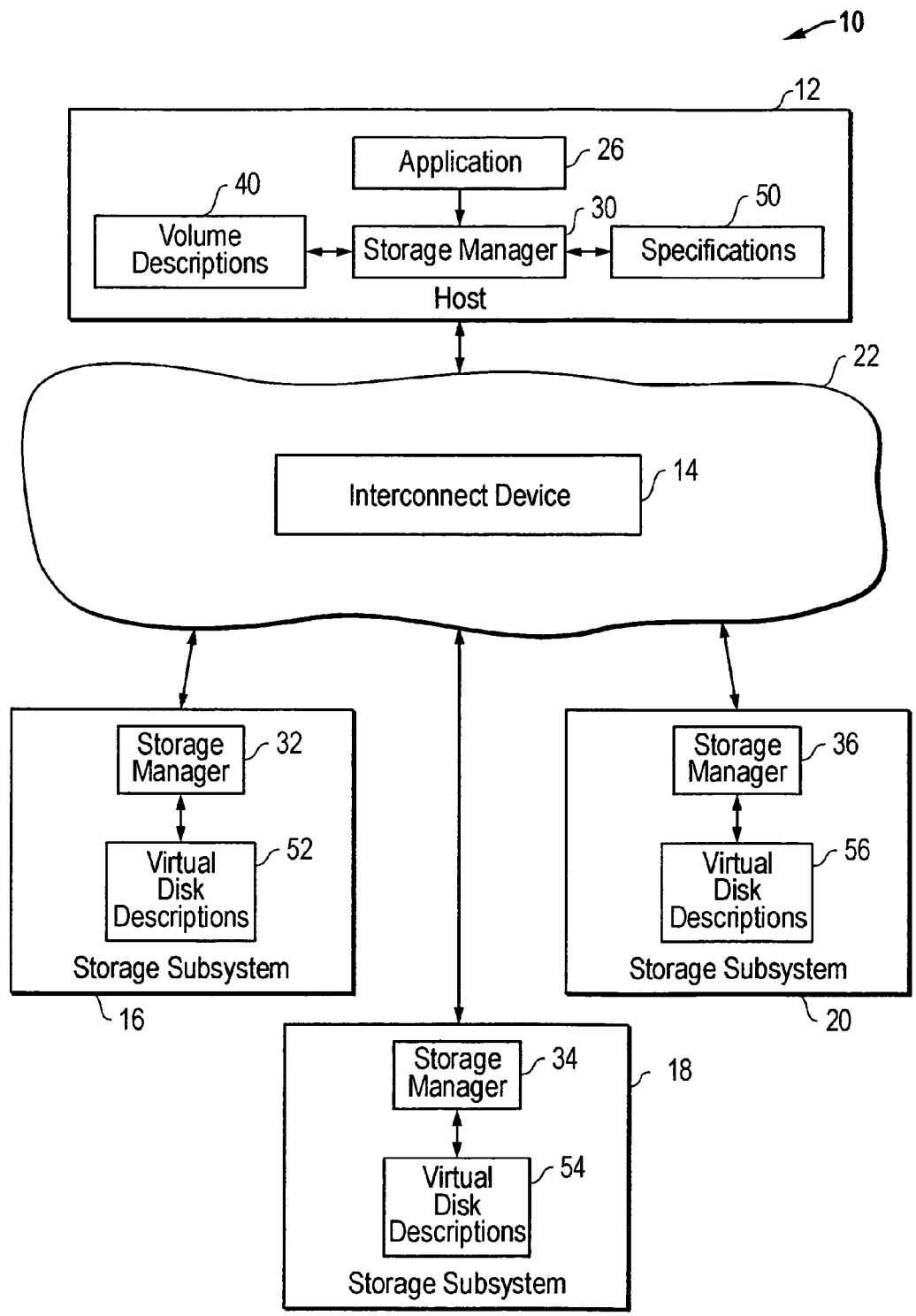
FIG. 1 illustrates a block diagram of a data center in which a logical data volume may be created and used.

Storage manager 90 is similar in many respects to storage manager 50 shown in FIG. 1. Storage manager 90, however, differs from storage manager 50 shown in FIG. 1 in at least one aspect. More particularly, storage manager 90 includes an intelligent storage provisioning module (ISPM) 84. In general, ISPM 84 functions as a policy management module that can monitor changes in one or more storage objects used to create a volume in order to detect aggregation rule violations and suggest corrective actions wherever possible. ISPM is also capable of generating messages or commands for correcting volume specification rule violations, in response to detecting a volume specification rule violation, as will be more fully described below. It is noted that in another embodiment ISPM 84 can be implemented as a software module that is independent of storage manager 90. Moreover, it is noted that ISPM 84 can be implemented in a device (e.g., interconnect device 80) other than host 72.

A logical volume description may be created by storage manager 90 for each logical volume it creates. These logical volume descriptions may be stored in logical volume description memory 100. In general, a logical volume description defines the direct or indirect relationship of a logical volume to its underlying virtual disks or other storage objects. The description may include a configuration map or algorithm that can be used to map each logical memory block of the logical volume to one or more logical blocks of one or more underlying virtual disks or other storage objects. It is noted that storage manager 90 can create a data volume having multiple levels of virtual storage objects. For example, storage manager 90 may create a two-way mirrored volume where each mirror is striped across several virtual disks provided by disk arrays 74-78. Descriptions for multi-level data volumes would have multiple configuration maps or algorithms, one for each level of abstraction. The present invention finds application in detecting aggregation rule violations in any level of a volume consisting of three or more levels of storage virtualization.

Storage manager 90 creates and uses a configuration map or algorithm to translate IO transactions that access a logical volume into one or more IO transactions that access one or more underlying virtual disks or other storage objects. Consider for example a three-way mirrored volume V created by storage manager 90. The three mirrors of volume V in this example are formed from logical storage in virtual disks M1, M2 and M3, respectively, provided by disk array 76. Volume V is structured to consist of $n_{max}$ logical memory blocks. Storage manager 90 creates a configuration map for volume V and stores the configuration map into memory 100. The configuration map maps each logical block x of volume V to respective logical blocks x in virtual disks M1, M2, and M3. When storage manager 90 receives an IO transaction to write data D to, for example, logical memory block 11 of volume V, storage manager 90 accesses the configuration map for volume V to learn that logical memory block 11 in volume V is mapped to logical blocks 11 in virtual disks M1, M2, and M3. Storage manager 90 can then generate and transmit three separate IO transactions to write data D to block 11 in virtual disks M1, M2, and M3, respectively.

FIG. 2 also shows that the disk arrays 74-76 have their own storage managers. Although not shown, interconnect device 80 may also include a storage manager. The disk array storage managers are configured to create virtual disks out of physical storage (i.e., one or more physical memory blocks) of one or more hard disks. The storage managers in disk arrays 74-78 are coupled to respective virtual disk description memories. Disk array storage managers create a virtual disk description for each virtual disk. These virtual disk descriptions may be stored in virtual disk description memories 102-106. The virtual disk description defines the relationship of a virtual disk to its underlying hard disks in addition to other information. The virtual disk description may also include a configuration map or algorithm that can be used to map each logical memory block of the virtual block to one or more physical memory blocks of one or more underlying hard disks. Storage managers 92-96 use configuration maps or algorithms to translate IO transactions that access a virtual disk into one or more IO transactions that access one or more underlying hard disks. Consider for example, virtual disk M1 created by storage manager 94 from storage in underlying hard disks d1 and d2 (not shown) of disk array 76. Virtual disk M1 is structured to consist of $n_{max}$ logical memory blocks. A description of virtual disk M1 is created and stored in memory 102. The description indicates that M1 is formed from a logical aggregation of storage in hard disks d1 and d2. Storage manager 94 also creates a configuration map for virtual disk M1 and stores the configuration map into memory 104. The configuration map maps each logical block x of virtual disk M1 to a physical block y in hard disk d1 or d2 in one embodiment. When storage manager 94 receives an IO transaction to write data D to, for example, logical memory block 11 of virtual disk M1, storage manager 94 accesses the configuration map for virtual disk M1 to learn that logical memory block 11 is mapped to, for example, physical memory block 911 in hard disk d2. Storage manager 94 can then generate an IO transaction to write data D to block 911.

It is noted that the configuration of virtual disks provided by disk arrays 74-78 can change over time. For example, the data of virtual disk d1 may be evacuated (for whatever reason) such that any M1 data stored in hard disk d1 is transferred to a new hard disk (e.g., disk d3) in disk array 76. When a virtual disk is reconfigured, the corresponding virtual disk description is updated to reflect the changes. For example, after the aforementioned data evacuation, the description for virtual disk M1 changes from an aggregation of storage in hard disks d1 and d2 to an aggregation of storage in hard disks d2 and d3. The corresponding configuration map is updated accordingly.

ISPM 84 of storage manager 90 detects violation of volume aggregation rules as a result of, for example, virtual disk reconfiguration. It is noted that the functions provided by ISPM 84 can be employed to detect violations of aggregation rules for storage objects other than volumes. Further, ISPM 84 should not be limited to use within a host device. At any rate, the present invention will be described with ISPM 84 detection of volume aggregation rule violations, it being understood that the present invention should not be limited thereto. To illustrate, presume storage manager 90 creates a three-way mirrored volume V according to a specification in memory 98, and that the mirrors are formed from storage of virtual disks provided by disk array 76. The specification in memory 98 for mirrored volume V requires that each mirror be formed from virtual disks that do not share underlying hard disks. Storage manager 90 forms the three mirrors of volume V from virtual disks M1-M3, respectively, provided by disk array 76. Virtual disk M1 was created by storage manager 94 as a concatenation of storage in hard disks d1 and d2, virtual disk M2 was created by storage manager 94 as a concatenation of storage in hard disks d3 and d4, and virtual disk M3 was created by storage manager 94 as a concatenation of storage in hard disks d5 and d6. Presume that hard disks d3 and d4 are large when compared to the other hard disks and contain a substantial portion of unused storage. Since none of virtual disks M1-M3 share hard disks for storing mirrored volume V data, volume V is initially consistent with its fault tolerance aggregation rule.

Presume that after creation of mirrored volume V, storage manager 94 of disk array 76 reconfigures virtual disks M1 and M3. More particularly, a first evacuation occurs such that M1 data stored in hard disk d2 is copied to available storage in disk d3. Thereafter a second evacuation occurs such that M3 data is copied from disk d5 to available storage in disk d4. Storage manager 94 also updates the descriptions, including the configuration maps, for virtual disks M1 and M3 to indicate that virtual disk M1 is a concatenation of storage in hard disks d1 and d3 and virtual disk M3 is a concatenation of storage in hard disks d4 and d6.

The sharing of hard disk d3 by virtual disk M1 and M2 and the sharing of hard disk d4 by virtual disks M2 and M3 violates the fault tolerance rule set forth for volume V mentioned above. This violation is detectable by ISPM 84. In one embodiment, ISPM 84 in general detects violations by accessing and analyzing information in one or more virtual disk description memories 102-106. The access by ISPM 84 can occur at predetermined times or in response to receiving an indication that one the existing virtual disks have been reconfigured.

The ISPM 84 accesses one or more virtual disk description memories 102-106 to read descriptions for one or more virtual disks used to form logical volumes. In one embodiment, ISPM 84 may limit its access to reading descriptions of virtual disks used in the direct or indirect creation of a particular volume, when for example, ISPM 84 receives an indication that a virtual disk used in creation of the particular volume, has been reconfigured. ISPM analyzes information in the virtual disk descriptions it reads to determine if any aggregation rule of a volume is violated.

To illustrate, presume ISPM 84 receives indication that virtual disks M1 and M3 described above have been reconfigured. ISPM 84 in response accesses the specifications memory 98 to see if virtual disks M1 and M3 have been aggregated to create a volume. ISPM 84 learns that virtual disks M1 and M3 are used as mirrors of mirrored volume V, and that all three mirrors M1, M2, and M3 of volume V are not to share hard disks. ISPM 84 then proceeds to check to see whether the aggregation rule(s) for volume V are maintained notwithstanding reconfigurations of virtual disks M1 and M3. More particularly, ISPM 84 accesses virtual disk descriptions memory 104 and reads the virtual disk descriptions for virtual disks M1-M3. The information read by ISPM 84 indicates that virtual disk M1 is a concatenation of storage in hard disks d1 and d3, virtual disk M2 is a concatenation of storage in hard disks d3 and d4, and virtual disk M3 is a concatenation of storage in hard disks d4 and d6. ISPM 84 then analyzes the structure of the virtual disks against the specification rules for mirrored volume V stored in memory 98. For example, the hard disks that form virtual disk M1 are compared by ISPM 84 with the hard disks that form virtual disk M2 to see if virtual disks M1 and M2 share any hard disk, ISPM 84 compares the hard disks that form virtual disk M1 with the hard disks to form virtual disk M3 to see if virtual disks M1 and M3 share any hard disk, and ISPM 84 compares the hard disks that form virtual disk M2 with the hard disks to form virtual disk M3 to see if virtual disks M2 and M3 share any hard disk. In the example, ISPM 84 would discover from the analysis of descriptions for virtual disks M1-M3 that the fault tolerance rule has been violated twice. Namely ISPM 84 would discover that virtual disks M1 and M2 share hard disk d3, and that virtual disks M2 and M3 share hard disk d4. It is emphasized that ISPM 84 is configured to detect violation of rules other than fault tolerance, the rule that prohibits virtual disk sharing of hard disks.

ISPM 84 can generate a message that informs a user of a volume aggregation rule violation. To illustrate, ISPM 84 may generate a message indicating that virtual disks M1 and M2 share a hard disk, and that virtual disks M2 and M3 share hard a disk, both in violation of the fault tolerance rule for volume V. ISPM 84 is capable of generating an instruction(s), that when implemented, correct the rule(s) violation. In this embodiment ISPM 84 may access virtual disk description memories 102-106 to identify virtual disks that can be used in further reconfiguring volume V without violating, for example, the fault tolerance rule for volume V. For example, ISPM 84 can access virtual disk description memories 102-106 to identify one or more virtual disks (e.g., virtual disk M4 and/or M5) consisting of hard disks other than hard disks aggregated to form virtual disks M1 and M3. It is noted that virtual disks M4 and M5 may or may not be in disk array 76. Once the non-violating virtual disks M4 and/or M5 are identified, ISPM 84 then generates an instruction to evacuate volume V data from virtual disk M1 to virtual disk M4 and to evacuate volume V data from virtual disk M3 to virtual disk M5. Alternatively, the instruction generated by ISPM 84 may include an instruction to evacuate volume V data from virtual disk M2 to virtual disk M4.

In still another embodiment, the instruction(s) generated by ISPM 84 may be machine executable. For example, the instruction to evacuate volume V data from virtual disk M1 to virtual disk M4 and from virtual disk M3 to virtual disk M5 may be executable within host 72. Specifically, the instruction to evacuate volume V data from virtual disks M1 and M3 may be executable by storage manager 90. Alternatively, ISPM 84 may generate an executable instruction to evacuate volume V data from virtual disk M2 to virtual disk M4. This alternative instruction may be executable by storage manager 94 in disk array 76, presuming in one embodiment virtual disk is provided by disk array 76. Either instruction, when executed, may result in a reconfiguration of volume V that does not violate, for example, the fault tolerance rule for volume V.

In still another embodiment, ISPM 84 will have the ability to evaluate two or more optional instructions for correcting aggregation rule violations, regardless of whether the instructions are machine executable, and regardless of how the aggregation rule violations were discovered. For example ISPM 84 may compare the two instructions noted above to determine which is less costly to implement in terms of the amount of data that needs to be evacuated. It is noted that the more data that needs to be evacuated, the more the costly it is to implement the instruction. ISPM 84 will select the instruction that involves the least amount of cost after analysis of the instruction options. Additionally, the ISPM 84 can list out the instructions for correcting rule violations in order of costs for user evaluation and selection.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:

1. A method comprising:
    logically aggregating a plurality of first physical storage devices to create a first storage object;
    logically aggregating a plurality of second physical storage devices to create a second storage object;
    logically aggregating the first and second storage objects to create a volume;
    reading identities of the plurality of first physical storage devices;
    reading identities of the plurality of second physical storage devices;
    processing the identities of the plurality of first physical storage devices and the identities of the plurality of second physical storage devices, wherein the processing is performed after creation of the volume;
    storing a result of the processing in memory;
    wherein the processing comprises an act of comparing the identity of each of the plurality of first physical storage devices with the identities of the plurality of second physical storage devices.

2. The method of claim 1 further comprising an act of generating a message if the identity of one of the plurality of first physical storage devices compares equally with the identity of any of the plurality of second physical storage devices.

3. The method of claim 2 wherein the message comprises an instruction to evacuate data stored in one of the first or second storage objects.

4. The method of claim 1 further comprising an act of generating an executable command if the identity of one of the plurality of first physical storage devices compares equally with the identity of any of the plurality of second physical storage devices.

5. The method of claim 4 wherein the executable command when executed evacuates data from one of the first and second storage objects.

6. The method of claim 4 wherein the executable command is transmitted to a storage subsystem that contains the plurality of first and second physical storage devices.

7. The method of claim 1 further comprising an act of accessing memory in a storage subsystem, wherein the memory contains identities of the plurality of first physical storage devices that form the first storage object and identities of the plurality of second physical storage devices that form the second storage object.

8. A computer readable memory for storing instructions executable by a computer system, wherein the computer system performs a method in response to executing the instructions, the method comprising:
    reading identities of a plurality of first physical storage devices, wherein storage in the plurality of first physical storage devices is logically aggregated to create a first storage object;
    reading identities of a plurality of second physical storage devices, wherein storage in the plurality of second physical storage devices is logically aggregated to create a second storage object;
    processing the identities of the plurality of first physical storage devices and the identities of the plurality of second physical storage devices;
    wherein the processing comprises an act of comparing the identity of each of the plurality of first physical storage devices with the identities of the plurality of second physical storage devices;
    storing a result of the processing in memory.

9. A computer readable memory for storing instructions executable by a computer system, wherein the computer system performs a method in response to executing the instructions, the method comprising:
    reading identities of a plurality of first physical storage devices, wherein storage in the plurality of first physical storage devices is logically aggregated to create a first storage object;
    reading identities of a plurality of second physical storage devices, wherein storage in the plurality of second physical storage devices is logically aggregated to create a second storage object;

comparing the identity of each of the plurality of first physical storage devices with the identities of the plurality of second physical storage devices;

storing a result of the comparing in a memory;

generating a message if the identity of one of the plurality of first physical storage devices compares equally with the identity of any of the plurality of second physical storage devices.

10. The computer readable memory of claim 9 wherein the message comprises an instruction to evacuate data stored in one of the first or second storage objects.

11. The computer readable memory of claim 9 wherein the method further comprises the computer system generating an executable command if the identity of one of the plurality of first physical storage devices compares equally with the identity of any of the plurality of second physical storage devices.

12. The computer readable memory of claim 11 wherein the executable command when executed evacuates data from one of the first and second storage objects.

13. The computer readable memory of claim 11 wherein the executable command is transmitted to a storage subsystem that contains the plurality of first and second physical storage devices.

14. A computer readable memory for storing instructions executable by a computer system, wherein the computer system performs a method in response to executing the instructions, the method comprising:

reading identities of a plurality of first physical storage devices, wherein storage in the plurality of first physical storage devices is logically aggregated to create a first storage object;

reading identities of a plurality of second physical storage devices, wherein storage in the plurality of second physical storage devices is logically aggregated to create a second storage object;

comparing the identity of each of the plurality of first physical storage devices with the identities of the plurality of second physical storage devices;

storing a result of the comparing in a memory;

accessing memory in a storage subsystem, wherein the memory contains identities of the plurality of first physical storage devices that form the first storage object and identities of the plurality of second physical storage devices that form the second storage object.

15. A system comprising:

a computer system coupled to a data storage sub-system;
    wherein the data storage subsystem comprises a plurality of first physical storage devices;
    wherein the data storage subsystem comprises a first storage manager for logically aggregating storage of the plurality of first physical storage devices to create a first storage object
    wherein the computer system comprises a memory for storing instructions executable by the computer system, wherein the computer system performs a method in response to executing the instructions, the method comprising:
    reading data that identifies the plurality of first physical storage devices;
    reading data that identifies a plurality of second physical storage devices, wherein storage in the plurality of second physical storage devices is logically aggregated to create a second storage object;
    processing the data that identifies the plurality of first physical storage devices and the data that identifies the plurality of second physical storage devices;
    wherein processing the data that identifies the plurality of first physical storage devices and the data that identifies the plurality of second physical storage devices comprises an act of comparing the data that identifies the plurality of first physical storage devices with the data that identifies the plurality of second physical storage devices.

16. A method comprising:

reading first information corresponding to a plurality of first hard disks, wherein storage in the plurality of first hard disks is logically aggregated to create a first storage object;

reading second information corresponding to a plurality of second hard disks, wherein storage in the plurality of second hard disks is logically aggregated to create a second storage object;

processing the first and second information to determine whether one of the first and one of the second hard disks are contained in a single disk array;

storing a result of the processing in memory;

wherein processing the first and second information to determine whether one of the first and one of the second hard disks are contained in a single disk array comprises an act of comparing the first information with the second information.

* * * * *